United States Patent
Meulendyk

[15] 3,689,103
[45] Sept. 5, 1972

[54] VARIABLE HEIGHT VEHICLE SUSPENSION

[72] Inventor: John W. Meulendyk, Kalamazoo, Mich.

[73] Assignee: Pneumo Dynamics Corporation, Cleveland, Ohio

[22] Filed: Nov. 27, 1970

[21] Appl. No.: 93,262

[52] U.S. Cl..............................280/124 F, 267/65 R
[51] Int. Cl..............................................B60g 17/04
[58] Field of Search ....280/124 F; 180/41; 267/65 R, 267/65 D, 34, DIG. 1

[56] References Cited

UNITED STATES PATENTS

| | | | |
|---|---|---|---|
| 3,100,635 | 8/1963 | Bougeard | 267/65 R |
| 3,006,657 | 10/1961 | Augustin | 280/124 F |
| 2,706,009 | 4/1955 | Schramm | 180/41 |

*Primary Examiner*—Philip Goodman
*Attorney*—Stephen M. Mihaly

[57] ABSTRACT

Variable height vehicle suspension system comprises a plurality of damper cylinders from which fluid is displaced from one end to the other for lowering the vehicle frame relative to the ground. The vehicle frame is ordinarily maintained at normal vertical height by mechanical springs which may be overpowered by pitching the vehicle frame to a lower elevation where it may be retained either by fluid entrapment within the damper cylinders or by a releasable mechanical lock or a combination thereof.

19 Claims, 6 Drawing Figures

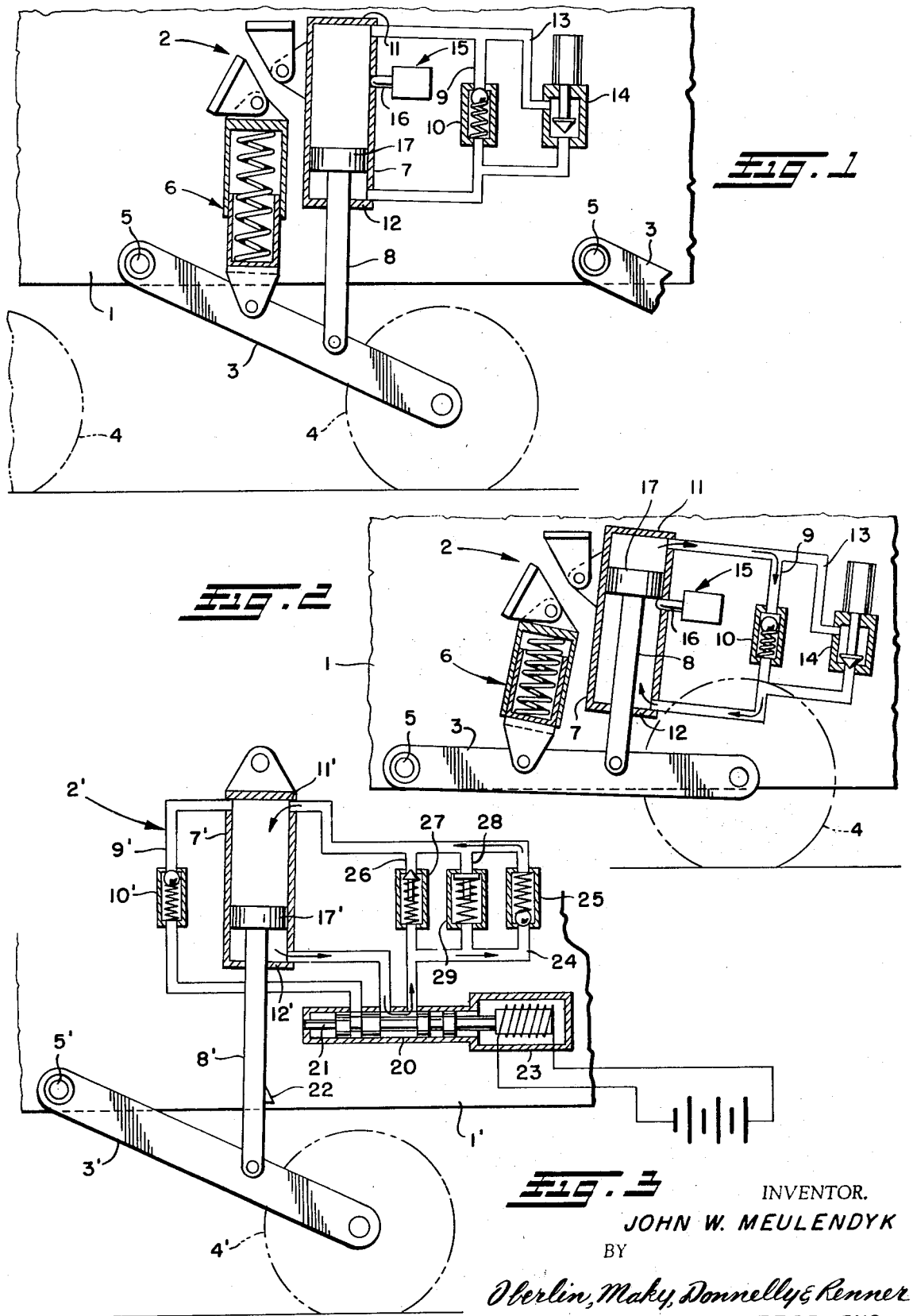

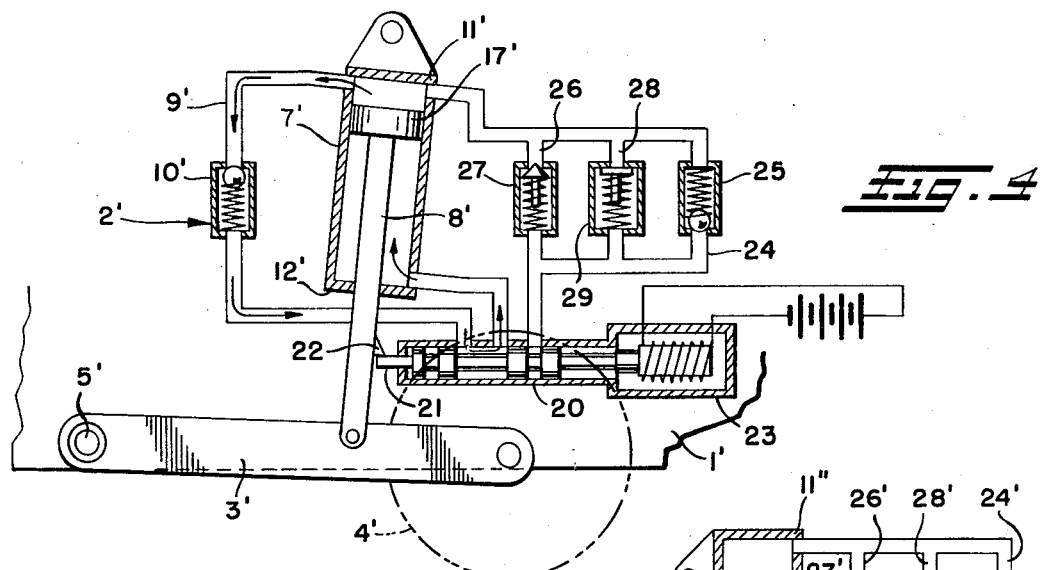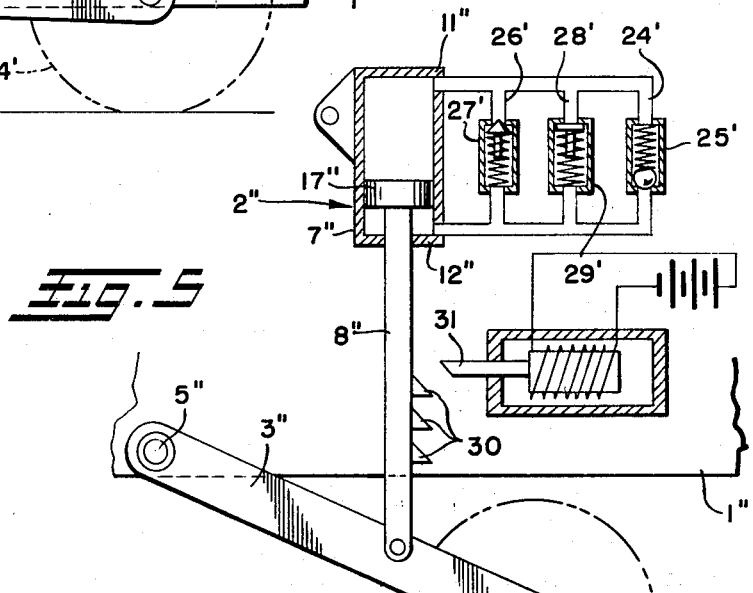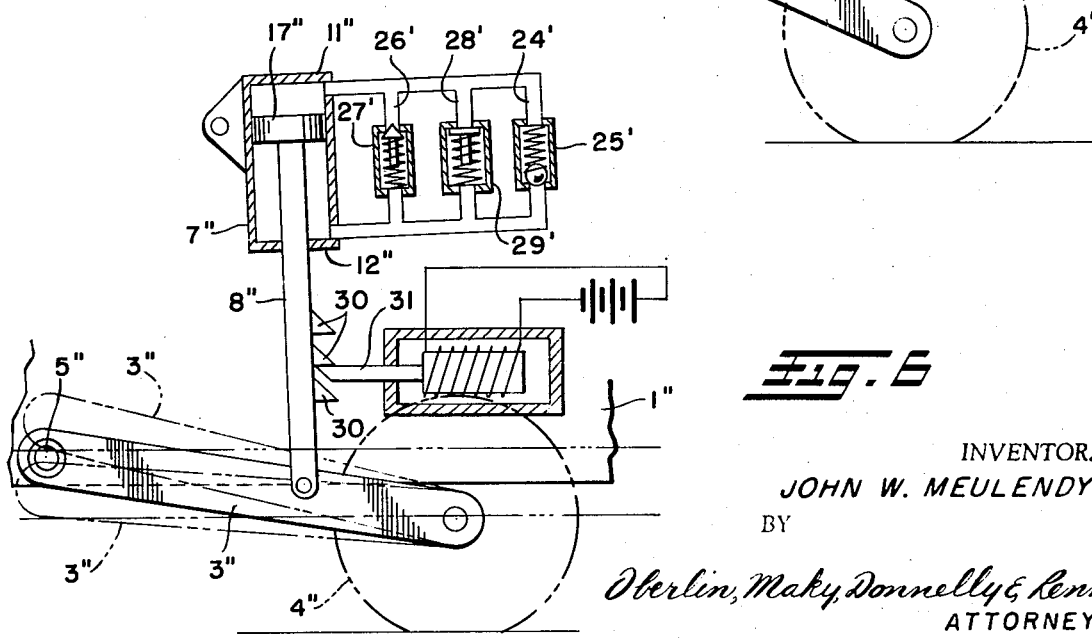

3,689,103

VARIABLE HEIGHT VEHICLE SUSPENSION

BACKGROUND OF THE INVENTION

This invention relates generally as indicated to a variable height vehicle suspension system especially for use on military vehicles to permit adjustment of the vertical height of the vehicle above ground to suit conditions.

Military and other vehicles which are driven over rough terrain require a high ground clearance for mobility, and yet there are instances when due to tactical and other reasons it is desirable to lower the silhouette of the vehicle for travel over flat terrain or while the vehicle is stationary. Heretofore, it has been the usual practice to alter the vertical height of the vehicle frame by providing the vehicle suspension with actuating cylinders which are pressurized to bring the vehicle frame to the desired level. However, this required the use of a hydraulic pump which had to be constantly operated to maintain the vehicle frame at the desired height with leakage present, and resulted in increased costs and reduced reliability.

SUMMARY OF THE INVENTION

With the foregoing in mind, it is a principal object of this invention to provide a simplified variable height suspension system which does not require any pump for operation.

A further object is to provide a variable height vehicle suspension system which may utilize a conventional suspension damping system for the vehicle to reduce cost.

Still another object is to provide such a variable height vehicle suspension system with a fail-safe position which corresponds to the normal ground clearance position for the vehicle frame as determined by mechanical springs to assure mobility of the vehicle in the event of a failure in the variable height system.

Yet another object is to provide such a variable height vehicle suspension system which permits utilization of the vehicle movements to generate the power necessary to vary the height of the vehicle frame from its normal static position to its maximum depressed position.

A further object is to provide such a variable height vehicle suspension system which may include a mechanical lock for locking the vehicle frame in the depressed position.

These and other objects of the present invention may be achieved by providing the vehicle suspension with a plurality of damper cylinders from which fluid is displaced from one end to the other during lowering of the vehicle frame. The vehicle frame is normally maintained at design ground clearance by mechanical springs or the like which may be overpowered as by pitching the vehicle to lower the vehicle frame where it may be retained either by fluid entrapment within the damper cylinders or by actuation of a releasable mechanical lock or a combination thereof. A mechanical lock avoids the necessity of having to maintain a perfect seal at the pistons and is particularly useful in retaining the vehicle in the lowered condition over extended periods of time.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

BRIEF DESCRIPTION OF THE DRAWINGS

In the annexed drawings:

FIG. 1 is a schematic view of a preferred form of variable height vehicle suspension system in accordance with this invention shown connected to the frame of a vehicle which is illustrated in its normal or design ground clearance position;

FIG. 2 is a schematic view similar to FIG. 1, but showing the vehicle frame in its maximum depressed or lowered position where it is retained by the variable height vehicle suspension system;

FIGS. 3 and 4 are schematic views of a modified form of variable height vehicle suspension system in accordance with this invention, attached to a vehicle frame, FIG. 3 showing the vehicle frame in the fully elevated position, and FIG. 4 showing the vehicle frame in the fully depressed position; and FIGS. 5 and 6 are schematic views of still another form of variable height vehicle suspension system in accordance with this invention attached to a vehicle frame, FIG. 5 showing the vehicle frame in the fully elevated position; and FIG. 6 showing the vehicle frame in the fully depressed position.

DESCRIPTION OF THE PREFERRED EMBODIMENTS

Referring now in detail to the drawings and first especially to FIGS. 1 and 2, there is schematically illustrated a vehicle frame 1 which may be for a heavy track vehicle such as a tank or armored vehicle used by the military or for a tire supported vehicle. Operation of any such vehicle over rough terrain requires that the normal design clearance between the ground and bottom of the frame 1 be quite high, and yet there are occasions when due to tactical and other reasons it is desirable to reduce the ground clearance to provide a lower vehicle silhouette either while the vehicle is stationary or operating on more level terrain. To permit adjustment of the vertical height of the vehicle frame relative to the ground, the vehicle may be provided with a variable height suspension system such as indicated at 2 and described in more detail hereafter.

The vehicle frame 1 is preferably normally maintained at the desired maximum design ground clearance shown in FIG. 1 by providing wheel mounts such as the pivotal road arms 3 for the vehicle wheels 4 which support the vehicle frame above ground utilizing mechanical springs such as torsion bars 5 or coil springs 6 or both. A plurality of conventional damper cylinders 7 may also be provided between the vehicle frame 1 and road arms 3 to dampen shock loads.

If desired, such damper cylinders 7 may be incorporated in the variable height suspension system 2 as shown in FIGS. 1 and 2, or separate damper cylinders may be provided for the variable height suspension system which requires at least one damper cylinder for each of the corner wheels of the vehicle and may include damper cylinders for every wheel. The damper cylinders 7 are desirably pivotally connected to the frame 1 and the rods 8 pivotally connected to the road arms 3 for the respective wheels. A fluid line 9 interconnecting opposite ends of each damper cylinder 7 contains a check valve 10 which permits fluid flow from the head end 11 of each damper cylinder 7 to the rod end 12 for lowering the vehicle frame 1 relative to the ground but not in the reverse direction.

There is also provided a bypass line 13 around each check valve 10 containing a solenoid operated valve 14 which when opened as shown in FIG. 1 permits restricted flow in either direction between the ends of the damper cylinders 7 to provide a dampening effect on the action of the mechanical springs during operation of the vehicle over rough terrain. Upon closing the solenoid operated valve 14 as shown in FIG. 2, fluid flow through the bypass line 13 is blocked, whereby fluid can only pass from the head end 11 of each cylinder 7 to the rod end 12 through the check valve 10. When this occurs the vehicle frame 1 will move closer to the ground where it will be retained by entrapment of the displaced fluid within the rod end of the cylinder. However, sufficient downward force must first be exerted on the vehicle frame to overcome the bias of the mechanical springs 5, 6, which may be readily accomplished by accelerating and braking the vehicle to cause the vehicle frame to pitch. During such pitching the piston rods 8 are caused to retract in their respective damper cylinders 7 and the mechanical springs are wound up or compressed and restrained from unwinding by fluid entrapment within the rod ends of the cylinders 7. Thus, in effect, the kinetic energy of the vehicle forward motion is transformed into the potential energy of the wound up or compressed mechanical springs 5, 6 which are racheted into position. If desired, each damper cylinder 7 may be provided with a releasable mechanical lock 15 which may comprise a solenoid actuated pin 16 mounted for movement into underlying relation to the damper piston 17 when in the retracted position to assist in retaining the vehicle frame in the lowered position. Such damper cylinders 7 and associated valves 10, 14 which comprise the variable height suspension system may be provided for the corner wheels only of the vehicle, or for all of the wheels.

If the damper cylinders and associated valves are limited to the four corner wheels, the vehicle frame will pitch about the center of gravity, and only the corner wheels will be racheted into position during lowering of the vehicle frame. In that event, the maximum spring force of the interior suspension springs must be limited such that they just sustain the weight of the vehicle frame. Otherwise, the vehicle frame will still be supported by the interior springs when the corner wheels are racheted upwardly, and the corner wheels will be off the ground. Dual rate torsion rods may also be used for the interior wheels so long as the spring force does not exceed approximately 5/3 gravities at the fully depressed position of the vehicle frame.

To maintain a reasonable pitch natural frequency, the torsional spring rate for the corner wheels is desirably made higher than that for the interior wheels. Higher rate springs for the corner wheels are also desirable for track-type vehicles to resist the vertical component of load imposed by the track tensioners.

Raising of the vehicle frame 1 back to the normal ground clearance position shown in FIG. 1 is easily accomplished by actuating the solenoid valve 14 to the open position permitting the force of the wound up or compressed mechanical springs 5, 6 to raise the vehicle frame relative to the wheels while forcing fluid from the rod end 12 of each damper cylinder 7 back to the head end 11 through the bypass passages 13. Of course, if the mechanical lock 15 was used to retain the vehicle frame in the lowered position, such mechanical lock must be released before the vehicle frame can be elevated. During elevation, the vehicle frame may be stopped in any intermediate position by again actuating the solenoid valve 14 to the closed position blocking further flow from the rod end 12 of each fluid damper 7 to the head end 11 thereof.

In FIGS. 3 and 4 there is shown a modified form of variable height vehicle suspension system 2' which is generally similar to the variable height suspension system 2 of the FIGS. 1 and 2 embodiment and accordingly the same reference numerals followed by prime symbols are used to designate like parts. As in the FIGS. 1 and 2 embodiment, the vehicle wheels 4' are supported by pivotal road arms 3' which have mechanical springs such as torsion rods 5' connected to the frame for normally maintaining the frame at design ground clearance. Damper cylinders 7' are also provided for at least the corner wheels of the vehicle, and such damper cylinders 7' have fluid lines 9' extending between the head and rod ends of the cylinders in which are contained check valves 10' that only allow fluid flow from the head ends to the rod ends, similar to the check valves 10 of the FIGS. 1 and 2 embodiment. In addition, however, there is provided a three-way solenoid operated valve 20 associated with the fluid line 9' and movable from the FIG. 3 position normally blocking fluid flow through the flud line 9' to the FIG. 4 position permitting such flow.

With the three-way valve 20 in the FIG. 4 position, when the driver brakes the vehicle, the vehicle frame will pitch forcing fluid from the head end of the cylinders 7' to the rod end to cause the piston rods 8' to retract into the damper cylinders while winding the torsion rods 5' up, after which they are restrained from unwinding due to liquid entrapment, as before. A lock pin 21 may be provided on the end of the three-way valve 20 for engagement with a tooth 22 on the piston rod 8' when the vehicle frame 1' is fully depressed to lock the vehicle frame in the fully lowered position. A latching solenoid 23 may be used for the three-way valve 20 to maintain the lock pin 21 in place against the piston rod 8' without having to continuously energize the solenoid.

Movement of the three-way valve 20 to the FIG. 3 position blocks flow through the fluid line 9' containing the check valve 10' and disengages the lock pin 21 from the piston rod 8'. Such movement of the three-way valve 20 also permits return flow from the rod end 12' of the damper cylinders 7' to the head end 11' through an additional fluid line 24 which then interconnects the head and rod ends through the three-way valve 20. A rebound check valve 25 may be contained within the additional fluid line 24 to permit flow from the rod end 12' to the head end 11' of the respective damper cylinders 7' for return movement of the vehicle frame 1 to the elevated position by the force of the wound up torsion rods 5'. A bypass line 26 may also be provided around the rebound check valve 25 containing a jounce valve 27 permitting restricted flow from the head end of the associated damper cylinder to the rod end when the three-way valve is in the FIG. 3 position to achieve a dampening effect of the torsion rods 5' during travel of the vehicle over rough terrain. Yet another bypass passage 28 may be provided across the rebound check valve 25 containing a blow-off valve 29 permitting large flow from the head end 11' of the damper cylinders 7' to the rod end 12' in the event that excessive pressures are encountered due to shock loads.

Still another form of variable height vehicle suspension system 2'' in accordance with this invention is shown in FIGS. 5 and 6, and the same reference numerals followed by a double prime symbol are used to designate like parts. The primary difference between this embodiment and the previous embodiments is that fluid pressure is not entrapped in the rod end 12'' of the damper cylinders 7'' to maintain the vehicle frame 1'' in the depressed or lowered position. Instead, a plurality of longitudinally spaced rachet teeth 30 are provided on each of the piston rods 8'' which may be successively engaged by a solenoid actuated lock pin 31 as shown in FIG. 6 to maintain the vehicle frame in progressively lower positions when the vehicle is pitched to cause retraction of the pistons 17'' within their respective cylinders 7''. The amplitude of damper piston travel during pitching of the vehicle must be at least as great as the distance between rachet teeth 30 or the torsion rods 5'' will immediately cause the vehicle frame to return to the previous raised position. In this embodiment there are also provided a rebound check valve 25' contained in a fluid line 24', a jounce valve 27' contained in a bypass line 26', and a blow-off valve 29' contained in a bypass passage 28', similar to the FIGS. 3 and 4 embodiment. The functions of these valves are restricted to those functions normally associated with damping cylinder operations, such as flow restriction and overpressure relief.

Upon release of the lock pin 31, the wound up torsion rods 5'' will return the vehicle frame 1'' to the fully elevated position shown in FIG. 5, and the damper cylinders 7'' will be free to dampen the movements of the vehicle over rough terrain.

From the foregoing, it will now be seen that the various forms of variable height vehicle suspension systems of the present invention are of a relatively simple and inexpensive design which may incorporate the damper cylinders of conventional suspension systems to further reduce costs. The variable height vehicle suspension systems desirably utilize vehicle movements to generate the power necessary to lower the vehicle frame, and should the systems fail, the vehicle will still be operable since the mechanical springs automatically return the vehicle frame to the normal ground clearance position upon loss of fluid pressure from the systems.

I, therefore, particularly point out and distinctly claim as my invention:

1. A variable height suspension system for a vehicle frame comprising a plurality of wheel mounts on said vehicle frame, means mounting said wheel mounts for movement toward and away from said vehicle frame to vary the vertical height of said vehicle frame with respect to the ground, means urging said wheel mounts away from said vehicle frame for normally maintaining said vehicle frame at design ground clearance, a plurality of fluid cylinders interconnecting said wheel mounts and vehicle frame, means for permitting displacement of fluid from the head end of said cylinders to the rod end for retraction of the pistons within said cylinders in response to a downward applied force to said vehicle frame for lowering said vehicle frame relative to the ground, and means for retaining said pistons in their retracted position to retain said vehicle frame in the lowered position.

2. The suspension system of claim 1 wherein said means for permitting displacement of the fluid from the head end of said cylinders to the rod end comprises a fluid line extending between the ends of each cylinder.

3. The suspension system of claim 2 wherein said means for retaining said pistons in their retracted position comprises a mechanical lock which when actuated prevents extension of said pistons.

4. The suspension system of claim 2 wherein said means for retaining said pistons in their retracted position comprises a mechanical lock means cooperable with the rod of each cylinder when the associated piston is in the retracted position preventing extension thereof.

5. The suspension system of claim 4 wherein there are a plurality of said projections on each rod, said lock pin being selectively engageable with any one of said projections for retaining said vehicle frame at different elevations.

6. The suspension system of claim 4 wherein said lock pin is solenoid actuated.

7. The suspension system of claim 2 further comprising valve means for selectively opening and closing said fluid lines.

8. The suspension system of claim 7 wherein said means for retaining said pistons in their retracted position comprises a projection on the rod of each cylinder, and a lock pin engageable with said projection when said pistons are in their retracted position to prevent extension thereof, said lock pin being connected to said valve means for operation thereby.

9. The suspension system of claim 7 further comprising a second fluid line between the ends of each cylinder, said valve means being operative to close said second fluid line upon opening said first mentioned fluid line and vice versa, said second fluid line when open permitting fluid flow from the rod end of the associated cylinder to the head end for return movement of said vehicle frame by said spring means.

10. The suspension system of claim 2 wherein said means for retaining the pistons in their retracted position comprises a check valve in each of said fluid lines which only permits fluid flow from the head end of said cylinders to the rod end.

11. The suspension system of claim 10 further comprising a second fluid line between the ends of each fluid cylinder, and valve means for selectively opening and closing said second fluid lines, said second fluid lines when open permitting fluid flow from the rod end of each cylinder to the head end for return movement of said vehicle frame by said spring means.

12. The suspension system of claim 10 further comprising a second fluid line between the ends of each cylinder, and valve means in each said second fluid line for selectively permitting fluid flow from the rod end of each cylinder to the head end.

13. The suspension system of claim 12 further comprising a third fluid line between the ends of each cylinder, and a blow-off valve in each said third line permitting additional flow from the head end of each cylinder to the rod end when excessive pressures are encountered due to shock loads.

14. The suspension system of claim 1 wherein said wheel mounts comprise road arms pivotally mounted to said vehicle frame, and said means for urging said wheel mounts away from said vehicle frame comprise torsion rods for the pivotal mounts.

15. The suspension system of claim 1 wherein said wheel mounts comprise road arms pivotally mounted to said vehicle frame, and said means for urging said wheel mounts away from said vehicle frame comprise coil springs between said road arms and vehicle frame.

16. The suspension system of claim 1 wherein only the corner wheel mounts for said vehicle frame are provided with said cylinders, said means for permitting displacement of fluid from the head end of said cylinders to the rod end for retraction of the pistons within said cylinders, and said means for retaining said pistons in their retracted position to retain said vehicle frame in the lowered position.

17. The suspension system of claim 1 wherein the downward force is applied to said vehicle frame by accelerating and braking said vehicle frame to cause said vehicle frame to pitch.

18. A variable height suspension system for a vehicle frame comprising a plurality of wheel mounts on said vehicle frame, means mounting said wheel mounts for movement toward and away from said vehicle frame to vary the vertical height of said vehicle frame with respect to the ground, means urging said wheel mounts away from said vehicle frame for normally maintaining said vehicle frame at design ground clearance, a plurality of fluid cylinders interconnecting said wheel mounts and vehicle frame, a fluid line extending between the ends of each cylinder for permitting displacement of fluid from the head end of said cylinders to the rod end for retraction of the pistons within said cylinders in response to a downward applied force to said vehicle frame for lowering said vehicle frame relative to the ground, a check valve in each said fluid line which only permits fluid flow from the head end of said cylinders to the rod end, a second fluid line between the ends of each cylinder, and valve means in each said second fluid line movable between an open position permitting fluid flow through said second fluid line and a closed position blocking fluid flow through said second fluid line.

19. The suspension system of claim 18 further comprising mechanical lock means which when actuated assists in retaining said vehicle frame in the lowered position.

* * * * *